(12) United States Patent
Hjorth

(10) Patent No.: US 11,231,132 B2
(45) Date of Patent: Jan. 25, 2022

(54) UNBONDED FLEXIBLE PIPE

(71) Applicant: National Oilwell Vareo Denmark I/S, Brondby (DK)

(72) Inventor: Michael Hjorth, Roskilde (DK)

(73) Assignee: National Oilwell Vareo Denmark I/S, Brondby (DK)

( * ) Notice: Subject to any disclaimer, the term of this patent is extended or adjusted under 35 U.S.C. 154(b) by 282 days.

(21) Appl. No.: 16/477,630

(22) PCT Filed: Dec. 6, 2017

(86) PCT No.: PCT/DK2017/050412
§ 371 (c)(1),
(2) Date: Jul. 12, 2019

(87) PCT Pub. No.: WO2018/130254
PCT Pub. Date: Jul. 19, 2018

(65) Prior Publication Data
US 2019/0338868 A1 Nov. 7, 2019

(30) Foreign Application Priority Data
Jan. 13, 2017 (DK) .......................... PA 2017 70023

(51) Int. Cl.
*F16L 11/00* (2006.01)
*F16L 11/12* (2006.01)
(Continued)

(52) U.S. Cl.
CPC ............. *F16L 11/12* (2013.01); *F16L 11/083* (2013.01); *E21B 17/01* (2013.01); *F16L 11/16* (2013.01);
(Continued)

(58) Field of Classification Search
CPC .......... F16L 11/12; F16L 11/083; F16L 11/16; F16L 59/153; F16L 2011/047; E21B 17/01
(Continued)

(56) References Cited

U.S. PATENT DOCUMENTS 1,910,642 A   5/1933  Sherrard
6,110,550 A * 8/2000  Jarrin .................. F16L 58/1009
                                               428/36.91

(Continued)

FOREIGN PATENT DOCUMENTS

CA    2848452 A1   3/2013
EP    3045794 A1   7/2016
(Continued)

OTHER PUBLICATIONS

Supplementary European Search Report for Application No. 17 89 1427, dated Sep. 4, 2020.
(Continued)

*Primary Examiner* — James F Hook
(74) *Attorney, Agent, or Firm* — Pearne & Gordon LLP

(57) ABSTRACT

An unbonded flexible pipe with a length and bore and an offshore installation are disclosed. The pipe comprises an internal pressure sheath, at least one metallic armouring layer surrounding the internal pressure sheath and at least one additional layer surrounding the metallic armouring layer. The metallic armouring layer comprises helically wound armouring elements which are at least partly covered by a viscous fluid having a kinematic viscosity of at least about 1000 cSt (ASTM D445 or ASTM D2170). The at least one additional layer surrounding the metallic armouring layer provides a gas escape route radially outwards from the metallic armouring layer beyond an outermost layer of the
(Continued)

least one additional layer or to a lengthwise gas escape path in or between the at least one additional layer.

22 Claims, 10 Drawing Sheets

(51) Int. Cl.
   *F16L 11/08* (2006.01)
   *E21B 17/01* (2006.01)
   *F16L 11/16* (2006.01)
   *F16L 59/153* (2006.01)
   *F16L 11/04* (2006.01)
(52) U.S. Cl.
   CPC ........ *F16L 59/153* (2013.01); *F16L 2011/047* (2013.01)
(58) Field of Classification Search
   USPC ................ 138/134, 135, 131, 149, 104, 132
   See application file for complete search history.

(56) References Cited

U.S. PATENT DOCUMENTS

| | | | | |
|---|---|---|---|---|
| 8,256,469 | B2* | 9/2012 | Felix-Henry | E21B 17/015 138/114 |
| 8,714,204 | B2* | 5/2014 | Bryant | B29D 23/001 138/130 |
| 8,820,412 | B2 | 9/2014 | Critsinelis et al. | |
| 8,960,239 | B2* | 2/2015 | Glejbol | F16L 11/00 138/137 |
| 9,482,372 | B2 | 11/2016 | Glejbol | |
| 2007/0119512 | A1* | 5/2007 | Rytter | F16L 11/081 138/126 |
| 2010/0101675 | A1 | 4/2010 | Do et al. | |
| 2011/0120583 | A1 | 5/2011 | Coutarel et al. | |
| 2011/0195208 | A1 | 8/2011 | Graham | |
| 2013/0068464 | A1 | 3/2013 | Critsinelis et al. | |
| 2013/0112307 | A1* | 5/2013 | Glejbol | F16L 11/16 138/137 |
| 2013/0209175 | A1 | 8/2013 | Keyworth | |
| 2013/0340877 | A1* | 12/2013 | Kassow | F16L 33/01 138/137 |
| 2014/0076450 | A1 | 3/2014 | Glejbol | |
| 2015/0152983 | A1* | 6/2015 | Kalman | B32B 15/043 138/124 |
| 2016/0123504 | A1* | 5/2016 | Pasquier | B32B 27/18 138/153 |
| 2016/0178106 | A1* | 6/2016 | Glejbol | F16L 11/081 138/130 |

FOREIGN PATENT DOCUMENTS

| | | |
|---|---|---|
| FR | 3086364 A1 | 3/2020 |
| GB | 2337367 A | 11/1999 |
| GB | 2482610 A | 2/2012 |
| GB | 2499379 A | 8/2013 |
| WO | 00/22328 A2 | 4/2000 |
| WO | 00/36324 A1 | 6/2000 |
| WO | 2005/028198 A1 | 3/2005 |
| WO | 2005043020 A1 | 5/2005 |
| WO | 2012/152282 A1 | 11/2012 |
| WO | 2013/044920 A1 | 4/2013 |
| WO | 2014/032674 A1 | 3/2014 |
| WO | 2014187462 A1 | 11/2014 |
| WO | 2015/028025 A1 | 3/2015 |
| WO | 2016/074681 A1 | 5/2016 |

OTHER PUBLICATIONS

Danish Search Report for Application No. PA 2017 70023, dated Jul. 11, 2017.
"Recommended Practice for Flexible Pipe", ANSI/API 17 B, Fifth Edition, May 2014.
"Specification for Unbonded Flexible Pipe", ANSI/API 17J, Fourth edition, May 2014.
International Search Report for International Application No. PCT/DK2017/050412, dated Jan. 26, 2018.

* cited by examiner

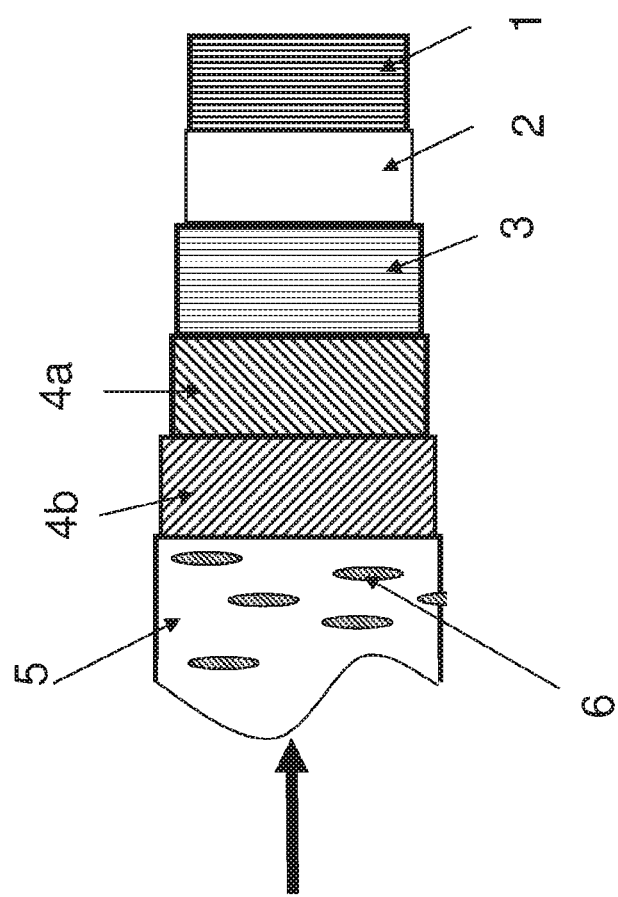

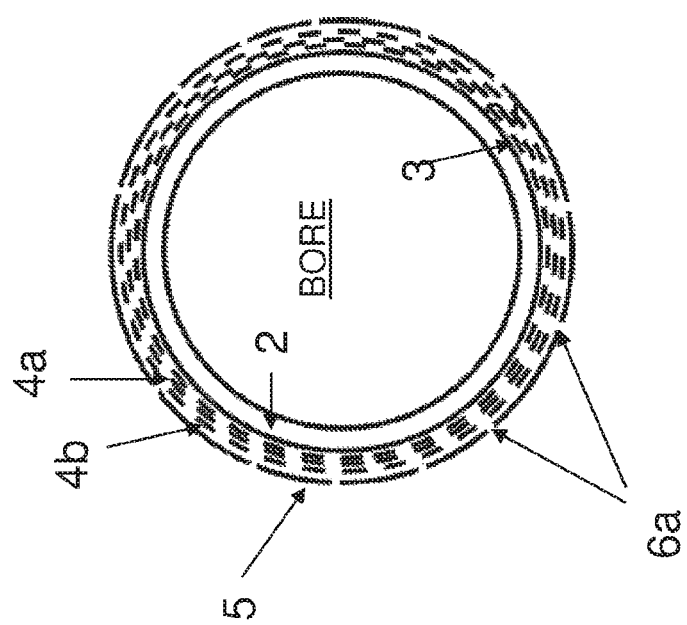

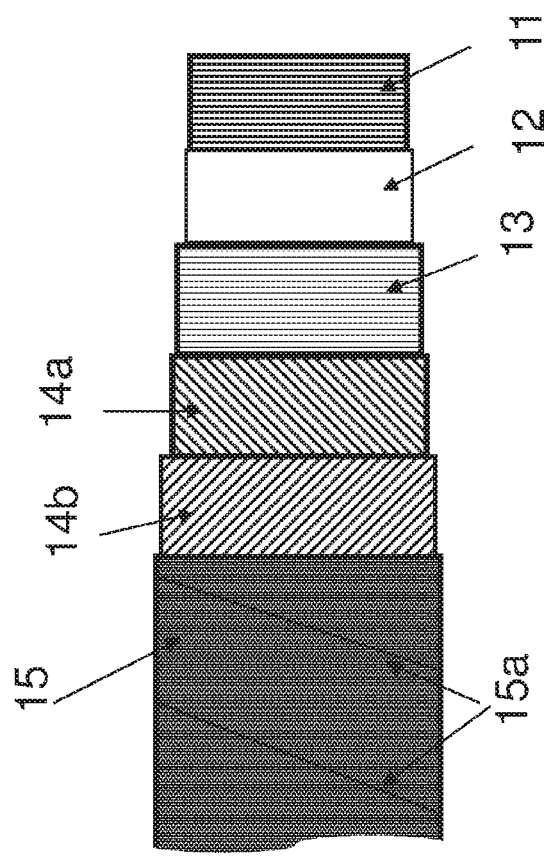

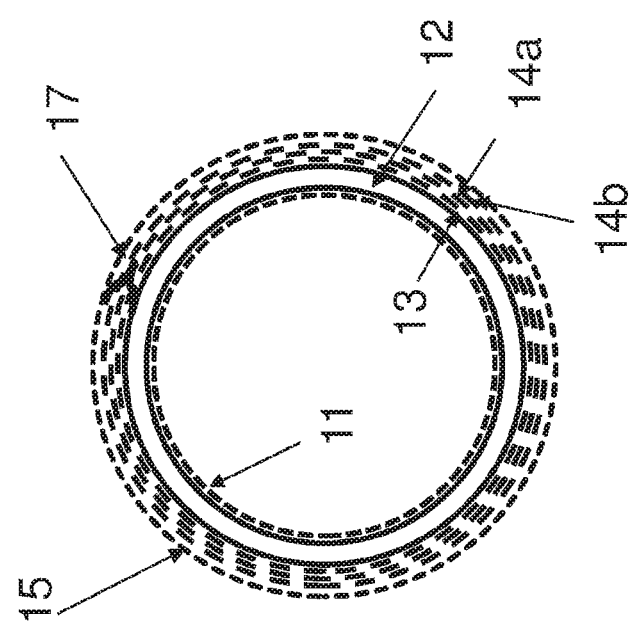

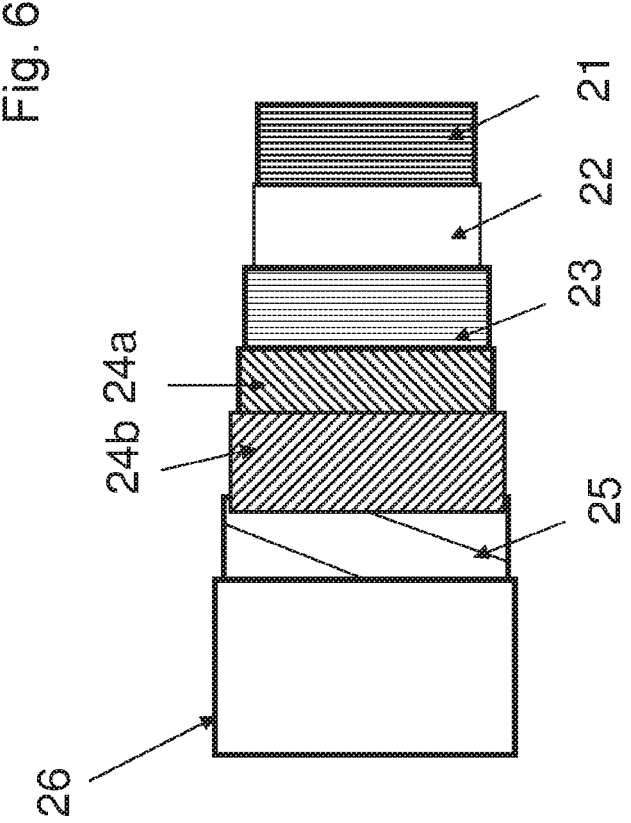

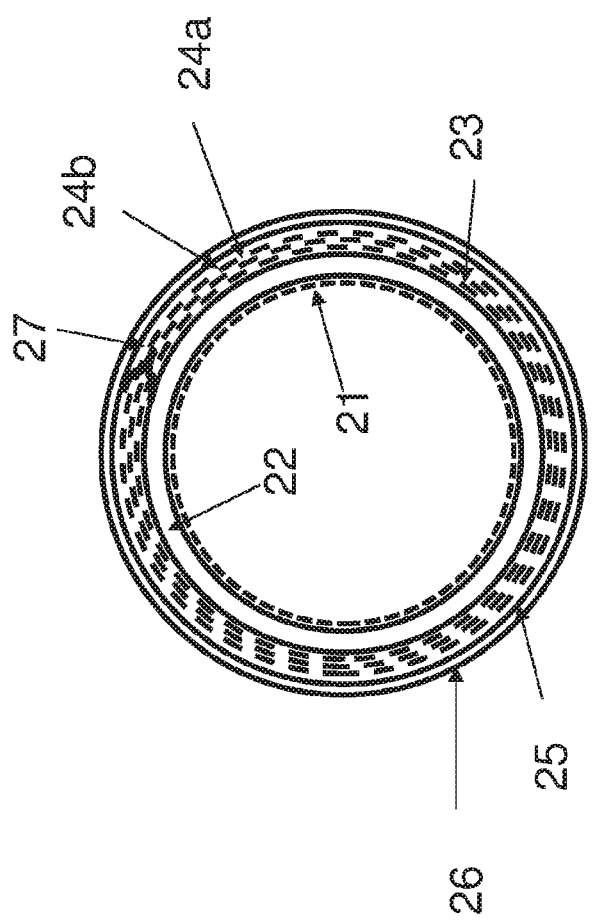

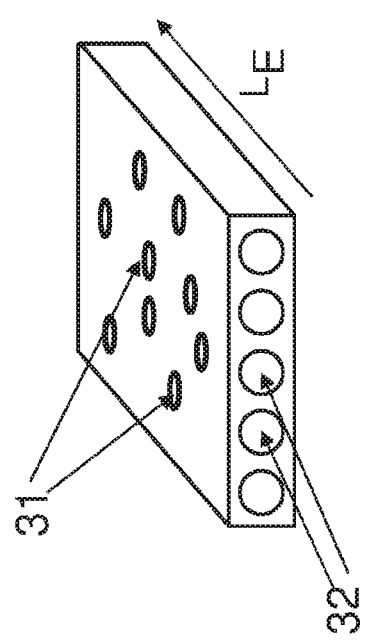

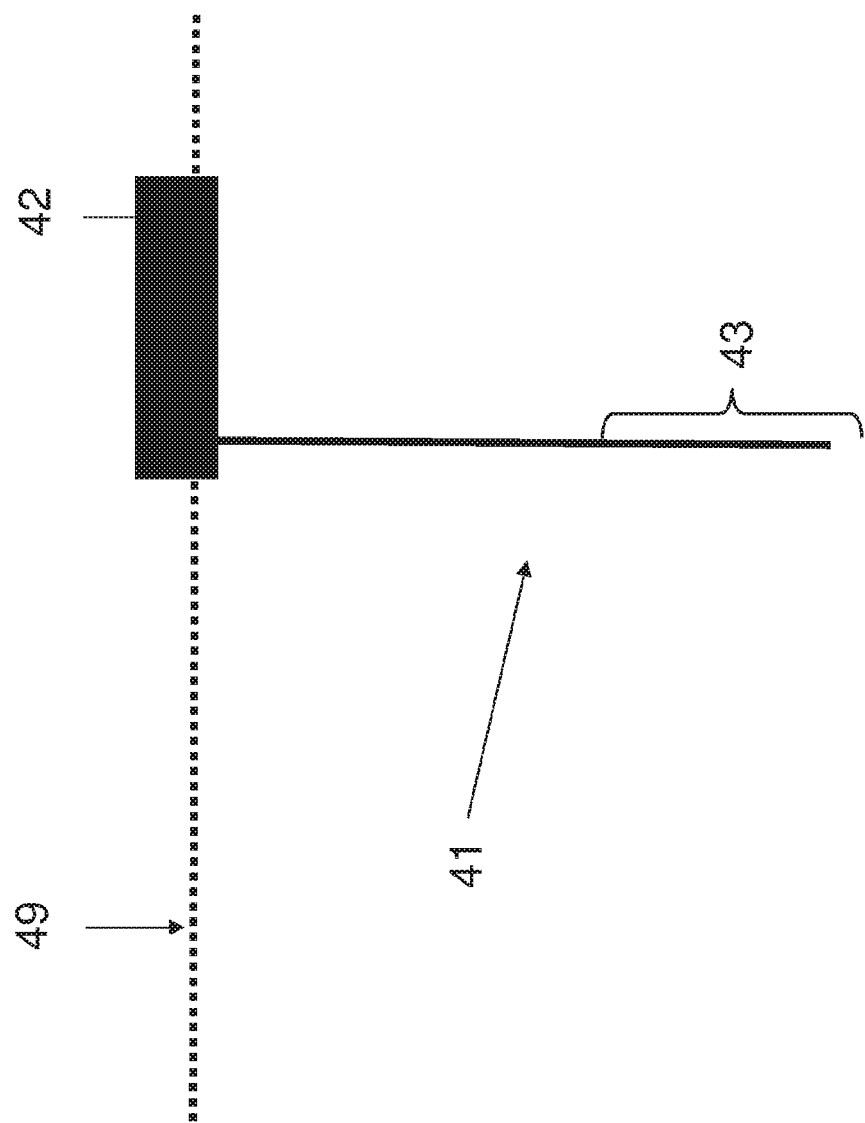

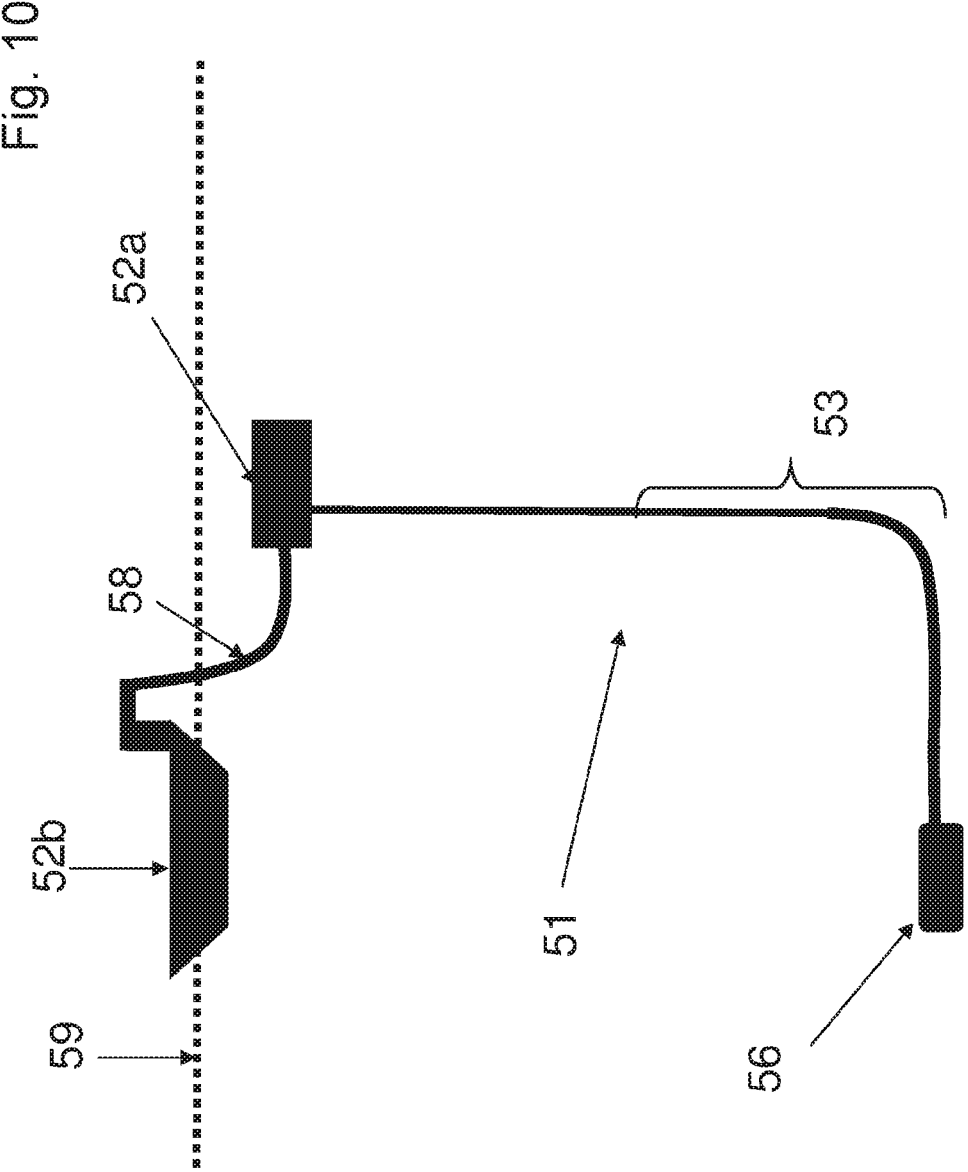

UNBONDED FLEXIBLE PIPE

TECHNICAL FIELD

The present invention relates to steel armoured flexible pipes suitable for marine applications such as for transport of petrochemical fluids e.g. oil or gas or in a sub-sea environment.

Flexible pipes for offshore applications are generally known from the standard "Recommended Practice for Flexible Pipe", ANSI/API 17 B, fifth Edition, May 2014 (hereafter API17B), and the standard "Specification for Unbonded Flexible Pipe", ANSI/API 17J, Fourth edition, May 2014 (hereafter API17J).

Such pipes are generally referred to as bonded pipes or unbonded pipes. A bonded pipe generally is a pipe in which the steel reinforcement is integrated and bonded to a vulcanized elastomeric material. An unbonded pipe generally is a pipe comprising separate unbonded polymeric and metallic layers, which allows relative movement between layers. The present invention generally concerns unbonded flexible pipes.

Such an unbonded flexible pipe may comprise a number of independent layers, such as helical wound steel and polymeric layers, as well as extruded polymeric layers formed around a central bore. A typical steel armoured flexible pipe comprises from the inside and outwards an inner armouring layer known as the carcass, an internal pressure sheath surrounded by one or more armouring layers, such as pressure armouring and tensile armouring, and an outer sheath. Thus, the internal pressure sheath forms a bore in which the fluid to be transported is conveyed and thereby ensures internal fluid integrity and stability. In some unbonded flexible pipes the carcass may be omitted. In some unbonded flexible pipes only the pressure armour is made from steel whereas the tensile armour is made from fibre reinforced polymer composites.

The annular space or spaces outside the internal pressure sheath, which houses the steel armour layers are usually referred to as the annulus or annuli.

The flexible pipes may for example be applied for carrying the fluids between a hydrocarbon reservoir located under the seabed either to a junction point between subsea structures or from the seabed to a floating structure. The fluid may be a hydrocarbon fluid, such as natural gas or oil, water, CO2 or a mixture hereof depending upon the nature of the hydrocarbon reservoir. The fluid may also be an injection fluid such as water, supercritical CO2 or methanol.

In general, flexible pipes are expected to have a lifetime of about 20 years in operation.

Unbonded flexible pipes are e.g. used for the transport of oil and gas at large or intermediate sea depths. The mentioned construction is particularly well suited for the transport of oil and gas from subsea sources to installations at sea level where the oil and gas are being treated or forwarded for further processing such as for example by compression, filtering, separation, distillation and/or further treatment.

The armouring layers surrounding the internal pressure sheath may for example comprise one or more pressure armour layers comprising one or more armouring profiles or strips, which are wound around the internal pressure sheath at a large angle, e.g. larger than 80°, relative to the centre axis of the pipe. This or these pressure armour layers primarily compensate for radial forces in the pipe. The armouring layers surrounding the internal pressure sheath may also usually comprise one or more tensile armouring layers which are wound at a relative small angle, such as between 10° and 50°, relative to the centre axis of the pipe. This or these tensile armour layers primarily compensate for axial forces in the pipe. The armouring layers are typically made of steel. A typical unbonded flexible pipe is for example described in WO 00/36324.

To avoid prohibitively large radial deformations of the tensile armouring layers due to torsion, axial compression and/or bending of the pipe, a holding layer may be wound at a large angle around the tensile armouring layer(s). This armouring layer is usually of very flat profiles in the form of fibre reinforced polymeric tapes e.g. as described in US2010101675.

During operation water and gasses tend to diffuse from the bore of the pipe into the annulus or annuli of the pipe. Over time the diffused gasses may cause the pressure in the annulus to rise, which may lead to bust of the outer sheath. To prevent this, gas vent valves are normally mounted in the termination of pipes, such that the gas pressure in the pipe is relieved when the pressure in the annulus significantly exceeds ambient pressure, as. e.g. described in API 17B, 5.2.4.

Ingress of gas, and in particular ingress of gas and water into the annulus may result in simultaneous appearance of gas and water on the exposed steel surfaces of the armour. This may lead to localized corrosion of the steel armour elements located in the annulus, eventually leading to premature failure of the pipe.

In order to mitigate corrosion of the armour layers attempts have been made to prevent aggressive gasses such as hydrogen sulphide a carbon dioxide gasses from reaching the annulus. One strategy for preventing gasses reaching the armour wires is described in US2011120583A. Herein the pressure sheath is filled with a reactive compound which reacts with diffusing gasses before they reach the annulus and thus the armour wires. Another strategy for preventing gasses from reaching the annulus is described in WO 05/028198 according to which an impermeable film is applied between the bore and the annulus.

WO16074681 discloses a method of installing an unbonded flexible pipe, wherein at least a part of the annulus is filled with a corrosion promoting liquid to thereby provide an even corrosion, which is less damaging to the pipe compared to localized corrosion.

US2011195208 discloses a method of protecting the armour layers by applying a boron holding grease or fluid or oil for the purpose of increasing acid resistance and/or corrosion resistance of the armor element.

DISCLOSURE OF INVENTION

An object of the present invention is to provide a flexible pipe with separate unbonded polymeric and metallic layers, which allows relative movement between layers—herein referred to as an "unbonded flexible pipe"—and wherein the risk of corrosion—in particular localized corrosion—is very low.

In an embodiment it is an object to provide an unbonded flexible pipe with a high resistance of armour corrosion even when used at high temperature and high pressure.

In an embodiment it is an object to provide an unbonded flexible pipe suitable for used at relative deep water e.g. below 2000 m and where the risk of armour corrosion is very low.

In an embodiment it is an object to provide an unbonded flexible pipe which can withstand operation under severe conditions without requiring additional means of pumping out gasses via an annulus.

These and other objects have been solved by the invention as defined in the claims and as described herein below.

The pipe of the invention is of the unbonded type and comprises from inside and out an internal pressure sheath defining the bore, at least one metallic armouring layer surrounding the internal pressure sheath and at least one additional layer surrounding the metallic armouring layer, preferably two or more metallic armouring layers.

The metallic armouring layer(s) comprises helically wound armouring elements which are preferably not bonded to each other along their lengths such that relative movement between layers or at least some of the armour elements is allowed. The armour elements are at least partly covered by a viscous fluid having a kinematic viscosity of at least about 1000 cSt (ASTM D445 or ASTM D2170 at 100° C.). The covering may e.g. be in the form of a coating of the viscous fluid or a partial or fully embedding in the viscous fluid.

The at least one additional layer surrounding the metallic armouring layer provides a gas escape route radially outwards from the metallic armouring layer to thereby provide a radial venting of the pipe.

In an embodiment the gas escape route radially outwards from the metallic armouring layer extends to beyond an outermost layer of the least one additional layer.

In an embodiment the gas escape route radially outwards from the metallic armouring layer extends to a lengthwise gas escape path in or between the at least one additional layer, such as in or between isolation layer(s) of the additional layer(s) surrounding the metallic armouring layer.

In the attempt to solve the above discussed problems, it was found that rather than preventing corrosive gasses in the annulus, corrosion could be prevented or reduced using a viscous fluid which blocks free surface sites on the metallic armour elements to thereby prevent water molecules in reaching free surface sites on the metallic armour elements. However, it was found that the viscous fluid tends to prevent conventional venting of diffused gasses along the axis of the pipe which thereby could result in an undesired pressure build up in the annulus which increases the risk of damaging the pipe by burst and/or collapses in case of production stop. The gas escape route radially outwards from the metallic armouring layer ensures that any risk of such a pressure build up in the annulus may be reduced or fully avoided—even where the viscous fluid fully blocks axial gas flow in the annulus—and at the same time the viscous fluid ensures a high corrosion protection of the armour elements of the metallic armouring layer(s)

The "annulus" is herein defined as the annular encasing space formed by the internal pressure sheath and the at least one additional layer surrounding the metallic armouring layer(s). The terms "annulus" and "annular encasing space" are herein used interchangeable in the disclosure of the invention.

The term "radial distance" is used herein to mean the distance to the axis of the pipe determined perpendicularly to the axis when the pipe is substantially straight.

The term "radially outwards" means radially outwards from the annulus in contrast to axially. A radially outwards gas flow need not to be perpendicular to the axis but will usually include a radially outwards gas flow within up to about 10 m of the pipe, such as up to about 5 m of the pipe, such as up to about 3 m of the pipe.

The term "substantially" should herein be taken to mean that ordinary product variances and tolerances are comprised.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

The terms "inside" and "outside" a layer of the pipe are used to designate the relative distance to the axis of the pipe, such that inside a layer means the area encircled by the layer i.e. with a shorter axial distance than the layer, and "outside a layer" means the area not encircled by the layer and not contained by the layer, i.e. with a longer axial distance than the layer.

The term "inner side" of a layer is the side of the layer facing the axis of the pipe. The term "outer side" of a layer is the side of the layer facing away from the axis of the pipe.

The term "cross-wound layers" means that the layers comprises wound elongate elements that are wound in opposite direction relatively to the longitudinal axis of the pipe where the angle to the longitudinal axis can be equal or different from each other.

Filaments are continuous single fibre (also called monofilament).

The phrase "continuous" as used herein in connection with fibres, filaments, strands, or rovings means that the fibres, filaments, strands, yarns, or rovings generally have a significant length but should not be understood to mean that the length is perpetual or infinite. Continuous fibres, such as continuous filaments, strands, yarns, or rovings preferably have length of at least about 10 m, preferably at least about 100 m, more preferably at least about 1000 m.

The term "strand" is used to designate an untwisted bundle of filaments.

The term "yarn" is used to designate a twisted bundle of filaments, strands and/or cut fibres. Yarn includes threads and ropes. The yarn may be a primary yarn made directly from filaments and/or cut fibres or a secondary yarn made from yarns and/or cords. Secondary yarns are also referred to as cords.

The term "cut fibres" means herein fibres of non-continuous length, e.g. in the form of chopped fibres or melt blown fibres. The cut fibres are usually relatively short fibres e.g. less than about 5 cm, such as from about 1 mm to about 3 cm in length. The cut fibres may have equal or different lengths.

The term "about" is generally used to include what is within measurement uncertainties. When used in ranges the term "about" should herein be taken to mean that what is within measurement uncertainties is included in the range.

Filament yarn consists of filament fibres either twisted together or only grouped together. Thicker monofilaments are typically used for industrial purposes rather than fabric production or decoration.

The term 'seabed' is generally used to denote the subsea floor.

The term "water line" means the water line at still water. Unless specifically mentioned all distances and determinations in relation to the water line are made at still water at average water level.

The term "horizontal" means in a plan parallel to the water line, and in the same way means "horizontal plan" a plan parallel to the sea water at still water and the term "horizontal direction" means a direction in the horizontal plan.

The term "above" means in a plan vertically above, where vertical direction is perpendicular to horizontal plan. In the same way the terms upper, uppermost as well as below, lower and lowermost mean with respect to vertical plans i.e. in higher respectively lower plans.

The term "downwards" means in a direction towards a lower plan.

Throughout the description or claims, the singular encompasses the plural unless otherwise specified or required by the context.

The unbonded flexible pipe is suitable for use for the transport of oil and gas at large or intermediate sea depths. The unbonded flexible pipe is particularly well suited for the transport of oil and gas from subsea sources to installations at sea level where the oil and gas are being treated or forwarded for further processing.

Advantageously the unbonded flexible pipe has an inner bore diameter of at least about 8 cm and preferably between 8 cm and 60 cm, such as in the range of 20-30 cm.

The gas escape route radially outwards from the metallic armouring layer may be achieved in a number of different ways.

In an embodiment the radial gas escape route comprises openings for free gas flow. In an embodiment escape routes are provided in the additional layer or layers surrounding the metallic armouring layer. For example the additional layer may be in form of or comprise an outermost layer which is liquid permeable e.g. by being a perforated layer e.g. an extruded and perforated layer. Such an outermost layer may e.g. be a protective jacket corresponding to the traditional outer sheath with the difference that the layer is perforated. The outermost layer may e.g. be made of polymer materials which are usually applied for the outer sheath, such a PE, crosslinked PE, PP, PA, PU or mixtures thereof.

The perforation may advantageously be in the form of a plurality of holes through the polymer layer, e.g. with a hole area of from about 0.1 $mm^2$ to about 10 $cm^2$, such as from about 1 $mm^2$ to about 5 $cm^2$, such as from about 5 $mm^2$ to about 1 $cm^2$. At least where the holes are relatively large, such as about 0.5 $cm^2$ or larger it is desired to have a tape layer, such as the retaining tape described further below, as a further of the additional layers below the protective jacket. The additional layers may also include one or more further layers which allow free gas flow, such as an thermal insulation layer which is wound without overlap and/or is perforated e.g. with perforation holes as described above.

In an embodiment the additional layer surrounding the metallic armouring layer has a minimum permeability radially outwards which is larger than the permeability of the internal pressure sheath with respect to at least one of water, hydrogen sulphide or carbon dioxide, preferably the escape route comprises openings for free gas flow radially outwards for gas to escape beyond the outermost layer. The permeability is determined at 100° C. and 10 bars and refers to the permeability at steady state, i.e. any lag periods is ignored.

In an embodiment the additional layer surrounding the metallic armouring layer comprises one or more wound tape layers. In an embodiment the additional layer(s) comprises at least one retaining layer of a helically wound tape wherein the helically wound tape is wound with overlapping edges.

The helically wound tape preferably comprises a structure of woven fibres, such as of filaments including carbon filaments, glass filaments, basalt filaments, polymer filaments or combinations thereof. The polymer filaments may e.g. be of aramid, polyester and/or polypropylene. In an embodiment the tape is as described in WO 2014/032674.

In an embodiment the tape is made from woven strands and/or yarns. The wowing advantageously comprises lengthwise continuous filament yarns (warp yarns) arranged in the tape length direction and woven with crossing weft yarns. In principle the crossing weft yarns can have any angle relative to the warp yarns.

Tape may be impregnated to ensure that the weft yarns and the warp yarns can stick together where they are crossing in their weaving structure. Where the tape is impregnated it should advantageously be ensured that the impregnation do not fully block for passage of gas flow through the tape.

The tape weaving is advantageously relative tight and preferably the numbers of warp yarns and weft yarns are relatively high to provide relatively small gas flow passages through the tape to thereby ensure that the viscous fluid is retained to cover the armouring elements. The warp yarns and weft yarns may for example be at least 5 yarns and/or strands per cm, such as at least 10 yarns and/or strands per cm.

In an embodiment the tape has an air permeability of at least about 25 $cm^3/sec/cm^2$ tape (ASTMD737-96), such as between about 50 and 500 $cm^3/sec/cm^2$.

In an embodiment the retaining layer is wound directly onto the metallic armouring layer with the viscous fluid i.e. in direct contact with the viscous fluid. The gas flow passages through the tape are advantageously sufficiently small to retain viscous fluid to cover the armouring elements. Fractions of the viscous fluid which have a relatively lower viscosity may be filtered through the retaining layer—i.e. low viscosity fractions may be exuding through the retaining layer due to the pressure applied to the retaining layer and the viscous fluid in the annulus. However, the viscous fluid has a higher kinematic viscosity, such as of at least about 1200 cSt, 1500 cSt, such as at least about 200 cSt.

In an embodiment the retaining layer is the outermost layer of the pipe and in use the sea water is acting directly onto the retaining layer. Due to the hydrophobicity of the viscous fluid it has been found that only minor amounts of sea water may permeate into the viscous fluid. The annulus and the viscous fluid in the annulus will be subjected to the sea level pressure.

In an embodiment the flexible pipe comprises one or more water permeable layers outside the retaining layer, such as one or more perforated layers.

In an embodiment the additional layer(s) comprises a thermal insulation layer, the thermal insulation layer preferably being helically wound strips of thermal insulation material. In an embodiment the thermal insulation layer preferably comprises the gas escape path in the form of one or more channel(s) in the thermal insulation layer, the gas escape path preferably extends to an end (end-fitting) of the pipe, the thermal insulation layer optionally comprises perforations into the gas escape path from the side of the thermal insulation layer facing the metallic armouring layer with the viscous fluid. The thermal insulation layer may e.g. be of long elements of a thermally insulating base material and comprising one or more longitudinally extending holes e.g. as described in WO 2013/044920 further comprising perforations into the longitudinal holes forming at least a part of the gas escape route. The long thermally insulating elements are advantageously helically wound, such that the one or more longitudinally extending holes form one or more axially lengthwise gas escape paths through which the gas can escape from the annulus after having passed radially outwards from the metallic armouring layer through the perforations of the thermally insulating elements and into the lengthwise gas escape paths from where the gas can be vented e.g. an end fitting e.g. positioned near or above the water line.

In an embodiment the thermal insulation layer has a permeability which is larger than the permeability of the internal pressure sheath with respect to at least one of water, hydrogen sulphide or carbon dioxide.

The internal pressure sheath is liquid impervious. However, significant diffusion through the sheath may occur during operation of the pipe. The internal pressure sheath may for example be extruded polymer, such as polyethylene, polyamide or polyvinylidene fluoride. The internal pressure sheath forms the bore in which the fluid to be transported is conducted. The inner surface of the internal pressure sheath may be supported by a carcass, which is a metallic armour layer placed in the bore and usually in contact with the fluid to be transported. In an embodiment the internal pressure sheath is a layered sheath. It is generally desired that the internal pressure sheath has a thickness of at least about 4 mm.

When the metallic armour elements of the one or more armour layers are wound around the pipe, winding will leave interstices between the individual armour elements. These interstices are is essential for the flexibility of the pipe. In an embodiment at least a part of these interstices are filled with the viscous fluid either during production or after production of the armour layer.

The mechanical strength of the viscous fluid is comparably low; hence, the presence of the blocking compound will in practice not affect the relative movability of the armouring elements of the unbonded flexible structure.

Due to the nature of the viscous fluid, it may have an additional benefit of lubricating internal surfaces of the pipe, hence reducing wear and fatigue of the armour elements significantly during operation. However, in an embodiment the pipe comprises one or more anti wear layers e.g. such anti wear layers known from the art.

In an embodiment where the unbonded flexible pipe is scheduled to operate at highly elevated temperatures, it may be beneficial to apply cross linking to the viscous fluid to prevent melting and loss from the annulus voids during operation of the pipe.

The viscous fluid advantageously has a kinematic viscosity of at least about 1500 cSt, such as at least about 2000 cSt, preferably viscous fluid has a kinematic viscosity of from about 1800 to about 6000 cSt, such as from about 2500 to about 5000 cSt. To ensure that the viscous fluid does not significantly affect the relative movability of the armouring elements it is desired that the kinematic viscosity is not too high, such as above 10000 cSt.

The viscous fluid may comprise solid particles, such as particles comprising silicates and/or metal, such as granular metallic particles having an electrode potential which is lower than the metal of the metallic armouring layer. Examples of silicates include clay silicates selected from kaolinite, such as dickite, halloysite, nacrite and serpentine; smectite, such as pyrophyllite, talc, vermiculite, sauconite, saponite, nontronite, hectorites (magnesiosilicates) and montmorillonite (bentonite); Illite; or chlorite.

In an embodiment the solid particles comprise components acting as sacrificial anode for the metal of the metallic armouring layer, such as zink particles.

In an embodiment the solid particles comprise chemically active products which may neutralize acidic gasses such as metal oxides selected from $Fe_2O_3$, $PbO$, $ZnO$, $NiO$, $CoO$, $CdO$, $CuO$, $SnO_2$, $MoO_3$, $Fe_3O_4$, $Ag_2O$, $CrO_2$, $CrO_3$, $Cr_2O_3$, $TiO$, $TiO_2$ or $Ti_2O_3$, and/or such as alkaline and alkaline-earth oxides selected from of $CaO$, $Ca(OH)_2$ or $MgO$.

In an embodiment solid particles comprise chemically active products selected from the group consisting of metal carbonates, metal chlorides, the hydrated forms of metal carbonates and metal chlorides, the hydroxylated forms of metal carbonates and metal chlorides, alkaline carbonates, alkaline-earth carbonates, alkaline chlorides, alkaline-earth chlorides, the hydrated forms of alkaline carbonates, alkaline-earth carbonates, alkaline chlorides, alkaline-earth chlorides and the hydroxylated forms of alkaline carbonates, alkaline-earth carbonates, alkaline chlorides, and alkaline-earth chlorides.

Generally it is desired that the viscous fluid is hydrophobic.

Examples of suitable viscous fluid are fluids based on petroleum jelly, grease, vax, bitumen or any combinations thereof optionally with solid particles and/or additives.

In an embodiment the viscous fluid is a cross-linked gel or comprises cross-linked gel particles.

The armouring layers may advantageously be such armouring layers as generally known from the art and be made from metallic armouring elements which are helically wound e.g. with the winding angles relative to the pipe axis as described above.

The armouring elements may advantageously be of steel e.g. such steel types which are generally known in the art.

Advantageously the armouring layer(s) includes at least one tensile armouring layer and preferably at least one pressure armouring layer.

In an embodiment the pipe comprises two or more metallic armouring layers surrounding the internal pressure sheath, the two or more metallic armouring layer are at least partly coated by a viscous fluid, preferably the two or more armouring layers comprise at least one tensile armouring layer and preferably two cross-wound tensile armouring layers.

In an embodiment the pipe comprises at least one pressure armouring layer, the at least one pressure armouring layer preferably being wound innermost relative to at least one tensile armouring layer.

It has been found that the corrosion rate in an unbonded flexible pipe without the viscous fluid is highly dependent of the pressure in the annulus, and thus that the risk of corroding the armouring layer(s) increases with increasing water depth when the pipe is in use. The unbonded flexible pipe as disclosed herein with the viscous fluid is therefore highly suitable for use at deep water, such as at water depth of 1000 m or more, such as 2000 m or more or even 3000 m or more. The unbonded flexible pipe is particularly suitable for use in oil production e.g. for transportation of crude oil or gas or other petrochemical products as well as $CO_2$ and or water.

Where the pipe is for use as a riser it has been found that only the part of the armouring layer(s) in the section of the pipe which is adapted to be closer to the seabed (in the following called the lowermost section) needs being corrosion protected by the viscous fluid, whereas the annulus in the uppermost section of the unbonded flexible pipe may be vented as it is generally known.

In an embodiment the metallic armouring layer(s) at least in a length section of the pipe is substantially embedded in the viscous fluid, the length section preferably has a length of at least about 100 m, such as at least about 200 m, such as at least about 500 m, such as the entire length of the pipe e.g. up to 3000 m or even longer.

The metallic armouring layer(s) are encased in an annular encasing space (the annulus) formed by the internal pressure sheath and the at least one additional layer surrounding the metallic armouring layer(s). In an embodiment the amount of viscous fluid in the annular encasing space is sufficient to block for axial gas flow in the annular encasing space in at least a length section of the pipe, the length section preferably has a length of at least about 100 m, such as at least about 200 m, such as at least about 500 m, such as the entire length of the pipe e.g. up to 3000 m or even longer.

In an embodiment at least a length section of the pipe, at least about 90%, such as at least about 95% of the encasing space minus space occupied by the metallic armouring layer(s) and optional intermediate anti wear tapes, is occupied by the viscous fluid, the length section preferably has a length of at least about 100 m, such as at least about 200 m, such as at least about 500 m, such as the entire length of the pipe e.g. up to 3000 m or even longer.

The invention also comprises an offshore installation comprising an unbonded flexible pipe as disclosed above.

Advantageously at least a length section of the pipe is arranged at deep water with a water depth of at least about 1000 m, such as at least about 2000 m, the pipe is preferably a riser pipe, the length section preferably has a length of at least about 100 m, such as at least about 200 m, such as at least about 500 m, such as the entire length of the pipe e.g. up to 3000 m or even longer.

Advantageously, the unbonded flexible pipe is arranged for transporting fluid between an upper facility and a subsea facility.

In an embodiment the offshore structure comprises an upper facility such as a floating structure e.g. a moored vessel.

In an embodiment where the floating structure is moored close to a gas field or hydrocarbon reservoir, it can be kept in fluid communication with the producing well heads via the unbonded flexible pipe. The unbonded flexible pipe may be arranged for conveying fluids between the well heads of a hydrocarbon reservoir and the floating structure. Flexible pipe or pipes, if there are several, may be configured as free-hanging catenaries or provided in alternative configurations, such as lazy wave and lazy S types, using buoyancy modules.

Thus, the flexible pipe may be connected at one end to the floating structure, and at another end to a pipe base manifold, by which the flexible pipe is secured to the sea bed.

BRIEF DESCRIPTION OF EMBODIMENTS AND ELEMENTS OF THE INVENTION

The above and/or additional objects, features and advantages of the present invention will be further elucidated by the following illustrative and non-limiting description of embodiments of the present invention, with reference to the appended drawings.

The figures are schematic and are not drawn to scale and may be simplified for clarity. Throughout, the same reference numerals are used for identical or corresponding parts.

FIG. 1 shows a schematic side view of an embodiment of an unbonded flexible pipe of the invention.

FIG. 2 schematically illustrates a cross sectional view of an embodiment of an unbonded flexible pipe of the invention.

FIG. 3 shows a schematic side view of an embodiment of an unbonded flexible pipe of the invention.

FIG. 4 schematically illustrates a cross sectional view of an embodiment of an unbonded flexible pipe of the invention.

FIG. 6 shows a schematic side view of an embodiment of an unbonded flexible pipe of the invention.

Figure 5A:
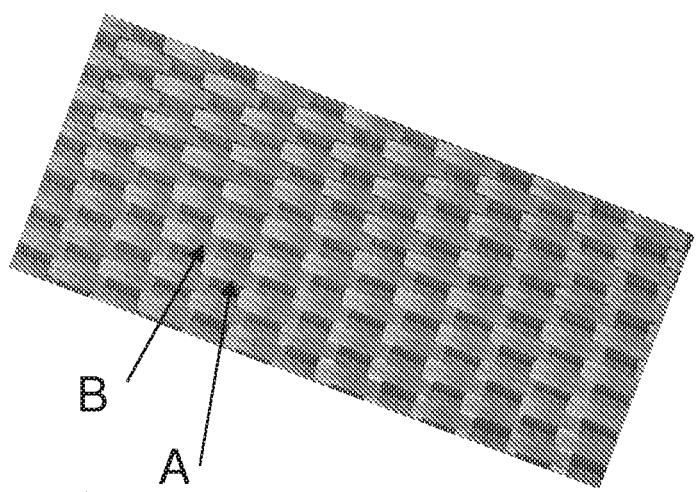
FIGS. 5a-5c show sections of three different retaining tapes in a schematic side view of an embodiment of an unbonded flexible pipe of the invention.

FIG. 7 schematically illustrates a cross sectional view of an embodiment of an unbonded flexible pipe of the invention.

FIG. 8 shows a section of a thermally insulating tape.

FIG. 9 illustrates a schematic side view of an embodiment of an offshore installation of the invention.

FIG. 10 illustrates a schematic side view of another embodiment of an offshore installation of the invention.

The unbonded flexible pipe shown in FIG. 1 comprises from inside and out a carcass 1, an internal pressure sheath 2, a metallic pressure armour layer 3, and a pair of cross wound metallic tensile armour layers 4a, 4b and finally an additional layer 5 surrounding the metallic armouring layer, the additional layer is in this embodiment an outer jacket 5. The outer jacket comprises perforations 6 for providing the gas escape route radially outwards from the metallic armouring layer. The metallic armour layers are made from or comprise metallic armouring elements which are helically wound to surround the internal pressure sheath 2. The metallic armouring elements may have any cross-sectional profile e.g. such as it is know from prior art unbonded flexible pipes. The arrow indicates the bore in which a fluid may be transported. The metallic armouring elements are at least partly covered by a viscous fluid which may be as defined above and preferably comprise at least one of grease, vax, bitumen and/or tar.

The outer jacket may advantageously be extruded and perforated. Examples of suitable polymer materials for the outer jacket are high density polyethylene (HDPE), cross linked polyethylene (PEX), polypropylene (PP), polyvinyldifluorid (PVDF) or polyamide (PA).

The unbonded flexible pipe shown in FIG. 2 is a variation of the unbonded flexible pipe of FIG. 1 where the pipe does not have a carcass and where the perforations are smaller.

The metallic armouring layers 3, 4a, 4b are encased in an annular encasing space—referred to as the annulus—formed by the internal pressure sheath 2 and the at least one additional layer 5 surrounding the metallic armouring layers 3, 4a, 4b. The amount of viscous fluid in the annular encasing space is sufficient to block for axial gas flow.

The outer jacket comprises a plurality of perforations 6a for providing the gas escape route radially outwards from the metallic armouring layer. The perforation may advantageous be evenly distributed in the outer jacket along the length of the pipe.

The unbonded flexible pipe shown in FIG. 3 comprises from inside and out a carcass 11, an internal pressure sheath 12, a metallic pressure armour layer 13, and a pair of cross wound metallic tensile armour layers 14a, 14b and finally an additional layer 15 surrounding the metallic armouring layer, the additional layer is in this embodiment a retaining layer 15. The metallic armour layers 13, 14a, 14b are made from or comprise metallic armouring elements which are helically wound to surround the internal pressure sheath 12. The metallic armouring elements are at least partly covered by a viscous fluid which may be as defined above and preferably comprises at least one of grease, vax, bitumen and/or tar.

The retaining layer is advantageously as described above and is wound onto the outermost armour layer 14b, with overlapping edges as illustrated with the lines 15a. In a variation of the embodiment of FIG. 3 the pipe may comprise a jacket outside the retaining layer, wherein the jacket preferably is perforated as discussed above.

FIG. 4 illustrates an unbonded flexible pipe corresponding to the unbonded flexible pipe of FIG. 3. Advantageously, the annulus 17 is substantially filled with the viscous fluid in at least a section of the unbonded flexible pipe.

The retaining layer may simultaneously with acting as a retaining layer for the viscous fluid also act as a holding layer for the tensile armour elements.

FIG. 5a illustrates an example of a tape for the retaining later. The retaining tape is woven very tightly and comprises lengthwise continuous filament yarns A forming warp yarns arranged in the tape length direction and woven with crossing weft yarns B also of filament yarn.

Figure 5B:
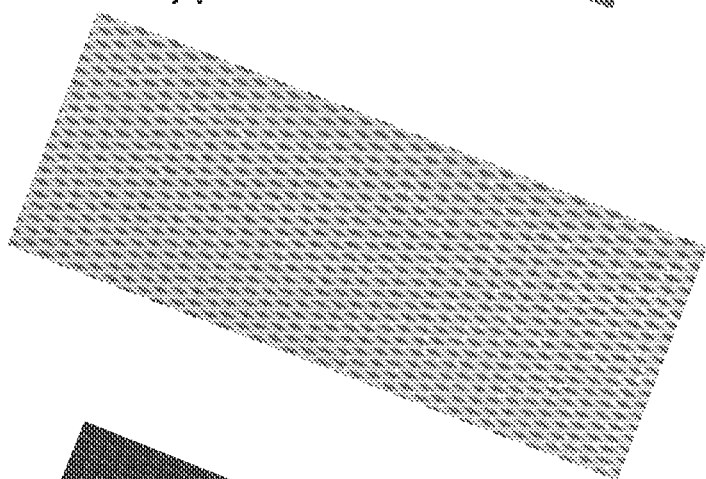

FIG. 5b illustrates another example of a tape for the retaining later. The retaining tape in this example is woven less tightly and it is preferred that a further layer e.g. is applied to cover a retaining layer of the type 5b retaining tape.

Figure 5C:
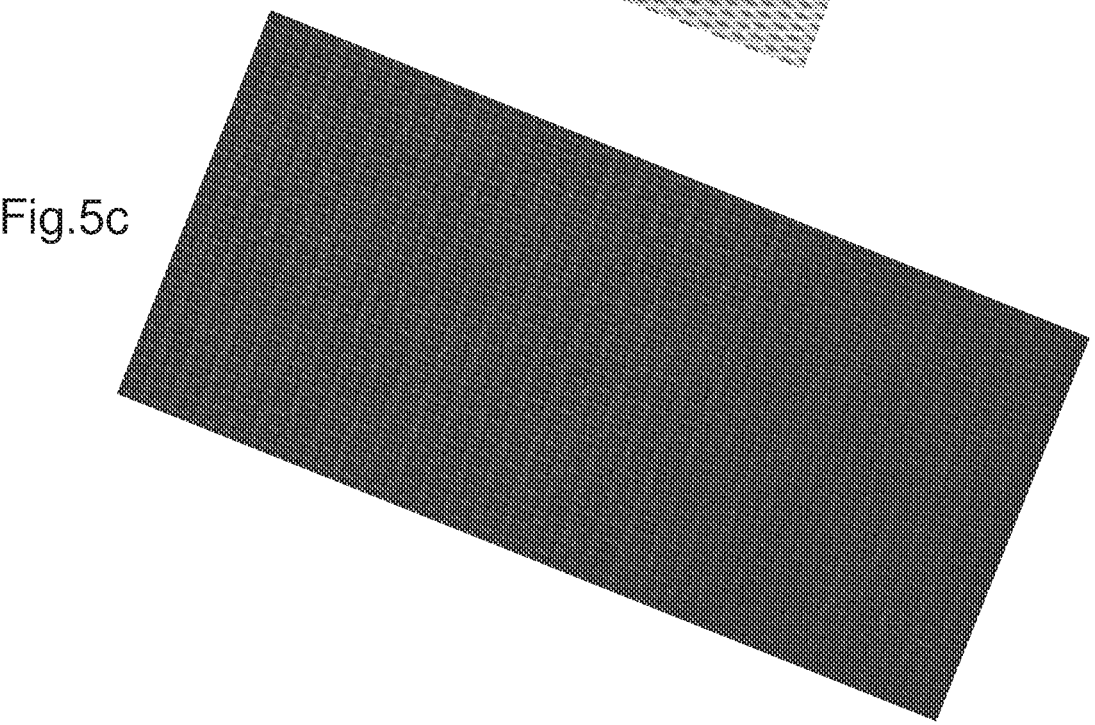

FIG. 5c illustrates a further example of a tape for the retaining later. The retaining tape in this example is a very tightly woven aramid tape (Kevlar).

The woven aramid tape is very strong and abrasion resistant and is a preferred choice for the retaining layer.

The unbonded flexible pipe shown in FIG. 6 comprises from inside and out a carcass 21, an internal pressure sheath 22, a metallic pressure armour layer 23, and a pair of cross wound metallic tensile armour layers 24a, 24b and two additional layers 25, 26.

The metallic armour layers 23, 24a, 24b are made from or comprise metallic armouring elements which are helically wound to surround the internal pressure sheath 22. The metallic armouring elements are at least partly covered by a viscous fluid which may be as defined above and preferably comprises at least one of grease, bitumen and/or tar.

The innermost of the additional layers is a thermal insulation layer made from one or more helically wound thermally insulation elements.

The thermal insulation elements may preferably comprise the gas escape path in the form of one or more channel(s) in the thermal insulation layer e.g. as the thermal insulation element illustrated in FIG. 8.

The thermal insulation elements may advantageously be as described in WO 2013/044920 further comprising perforations into the longitudinal holes forming at least a part of the gas escape route.

FIG. 8 shows an example of a thermal insulation element. The thermal insulation element has a length LE which may be from a few meters to several hundreds or even thousand meters. The length of the thermal insulation element may largely depend on it's thickness and thereby how long lengths that may be wound onto a spool in the production.

The thermal insulation element has a number of elongate holes 32 extending in the length LE of the thermal insulation element. The elongate holes 32 may form the lengthwise gas escape paths 32 through which the gas may escape axially along the length of the unbonded flexible pipe.

The thermal insulation element has on the side adapted for facing the annulus a plurality of perforations 31 into the elongate holes 32 to ensure a full gas escape route radially outwards from the metallic armouring layer through the perforations 31 and into the lengthwise gas escape paths 32 from where the gas can be vented e.g. at an end fitting e.g. near or above the water line.

The second of the additional layers is an outer jacket 26. The outer jacket may e.g. be perforated as described above. In an embodiment the outer jacket is liquid impervious and free of perforations.

FIG. 7 illustrates an unbonded flexible pipe corresponding to the unbonded flexible pipe of FIG. 6. Advantageously, the annulus 27 is substantially filled with the viscous fluid in at least a section of the unbonded flexible pipe.

In a variation both the thermal insulation layer 25 and the outer jacket 26 are perforated.

In a variation the thermal insulation element(s) is free of the perforations 31 and instead the material of the thermal insulation element has a permeability which is larger such as at least about 10% larger than the permeability of the internal pressure sheath with respect to at least one of water, hydrogen sulphide or carbon dioxide.

The offshore installation shown in FIG. 9 comprises an unbonded flexible pipe 41 of an embodiment of the invention as disclosed above. The unbonded flexible pipe 41 is a riser arranged for transporting fluid between an upper facility 42 and a not shown subsea facility. The upper facility 42 is a floating unit e.g. a vessel or a platform. Such a floating unit will often be moored using tethering lines or similar. The upper facility 42 is floating at the water line 49.

The riser may reach into very deep water, such as to 1000 m, 2000 or even deeper. The armouring layer(s) in the annulus of the unbonded flexible pipe 41 is substantially embedded in the viscous fluid in at least the lowermost section 43. The lowermost pipe section 43 preferably has a length of at least about 100 m, such as at least about 200 m, such as at least about 500 m.

In a variation thereof the armouring layer(s) in the annulus of the unbonded flexible pipe 41 is substantially embedded in the viscous fluid in substantially the entire length of the pipe e.g. up to 3000 m or even longer.

The offshore installation shown in FIG. 10 comprises an unbonded flexible pipe 51 of an embodiment of the invention as disclosed above. The unbonded flexible pipe 51 is a riser arranged for transporting fluid between an upper facility 52a and a not shown subsea facility 56. The upper facility 52a is arranged below the water line 59 and may for example be a mid-water arch or another submerged facility. A vessel 52b is connected to the upper facility 52a via a jumper 58. The armouring layer(s) in the annulus of the unbonded flexible pipe 51 is substantially embedded in the viscous fluid in at least the lowermost section 53. The lowermost pipe section 53 preferably has a length of at least about 100 m, such as at least about 200 m, such as at least about 500 m.

Further scope of applicability of the present invention will become apparent from the description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An unbonded flexible pipe having a length and bore and comprising an internal pressure sheath, at least one metallic armouring layer surrounding the internal pressure sheath and at least one additional layer surrounding the metallic armouring layer, wherein the metallic armouring layer comprises helically wound armouring elements which are at least partly covered by a viscous fluid having a kinematic viscosity of at least about 1000cSt determined at 100° C., and wherein the at least one additional layer surrounding the metallic armouring layer provides a gas escape route radially outwards from the metallic armouring layer beyond an outermost layer of the least one additional layer or to a lengthwise gas escape path in or between the at least one additional layer.

2. The unbonded flexible pipe of claim 1, wherein the radial gas escape route comprises openings for free gas flow, wherein the escape route comprises openings for free gas flow radially outwards for gas to escape beyond the outermost layer.

3. The unbonded flexible pipe of claim 1, wherein the additional layer(s) comprises a retaining layer of a helically wound tape, said helically wound tape is wound with overlapping edges, said helically wound tape comprises a structure of woven fibres optionally fully or partly embedded in a polymer matrix.

4. The unbonded flexible pipe of claim 3, wherein said retaining layer is wound directly onto the metallic armouring layer with the viscous fluid, said retaining layer is water permeable and comprises a woven structure which is sufficiently tight to retain the viscous fluid with a kinematic viscosity of at least about 1500 cSt.

5. The unbonded flexible pipe of claim 4, wherein said retaining layer is the outermost layer or the flexible pipe comprises one or more water permeable layers outside the retaining layer.

6. The unbonded flexible pipe of claim 1, wherein the additional layer(s) comprises a thermal insulation layer, said thermal insulation layer being helically wound strips of thermal insulation material.

7. The unbonded flexible pipe of claim 6, wherein said thermal insulation layer comprises said gas escape path in the form of one or more channel(s) in the thermal insulation layer, said gas escape path extends to an end of the pipe.

8. The unbonded flexible pipe of claim 6, wherein said thermal insulation layer comprises perforations forming at least a part of said gas escape route.

9. The unbonded flexible pipe of claim 6, wherein said thermal insulation layer has a permeability which is larger than the permeability of the internal pressure sheath with respect to at least one of water, hydrogen sulphide or carbon dioxide.

10. The unbonded flexible pipe of claim 1, wherein said additional layer(s) comprises a protective jacket, said protective jacket is liquid permeable, said protective jacket is perforated and constitutes the outermost layer of the least one additional layer.

11. The unbonded flexible pipe of claim 1 claims, wherein the viscous fluid comprises solid particles having an electrode potential which is lower than the metal of the metallic armouring layer.

12. The unbonded flexible pipe of claim 11, wherein the solid particles comprise components acting as sacrificial anode for the metal of the metallic armouring layer.

13. The unbonded flexible pipe of claim 11, wherein the solid particles comprise chemically active products selected from among metal oxides selected from the group consisting of $Fe_2O_3$, PbO, ZnO, NiO, CoO, CdO, CuO, $SnO_2$, $MoO_3$, $Fe_3O_4$, $Ag_2O$, $CrO_2$, $CrO_3$, $Cr_2O_3$, TiO, $TiO_2$ and $Ti_2O_3$, and from among the alkaline and alkaline-earth oxides selected from the group consisting of CaO, $Ca(OH)_2$ and MgO.

14. The unbonded flexible pipe of claim 11, wherein the solid particles comprise chemically active products selected from the group consisting of metal carbonates, metal chlorides, the hydrated forms of metal carbonates and metal chlorides, the hydroxylated forms of metal carbonates and metal chlorides, alkaline carbonates, alkaline-earth carbonates, alkaline chlorides, alkaline-earth chlorides, the hydrated forms of alkaline carbonates, alkaline-earth carbonates, alkaline chlorides, alkaline-earth chlorides and the hydroxylated forms of alkaline carbonates, alkaline-earth carbonates, alkaline chlorides, and alkaline-earth chlorides.

15. The unbonded flexible pipe of claim 1, wherein the viscous fluid is selected from petroleum jelly, grease, vax, bitumen or any combinations thereof.

16. The unbonded flexible pipe of claim 1, wherein the viscous fluid is a cross-linked gel or comprises cross-linked gel particles.

17. The unbonded flexible pipe of claim 1, wherein said metallic armouring layer(s) is encased in an annular encasing space formed by the internal pressure sheath and the at least one additional layer surrounding the metallic armouring layer(s), the amount of viscous fluid in the annular encasing space is sufficient to block for axial gas flow in the annular encasing space in at least a length section of the pipe, said length section has a length of at least about 100 m.

18. The unbonded flexible pipe of claim 1, wherein said metallic armouring layer(s) is encased in an annular encasing space formed by the internal pressure sheath and the at least one additional layer surrounding the metallic armouring layer(s), at least in a length section of the pipe at least about 90% of the encasing space minus space occupied by the metallic armouring layer(s) and optional intermediate anti wear tapes, is occupied by said viscous fluid, said length section has a length of at least about 100 m.

19. An offshore installation comprising an unbonded flexible pipe according to claim 1, wherein at least a length section of the pipe is arranged at deep water with a water depth of at least about 1000 m.

20. The offshore installation of claim 19, wherein the unbonded flexible pipe is arranged for transporting fluid between an upper facility and a subsea facility.

21. The unbonded flexible pipe of claim 1, wherein the radial gas escape route has a minimum permeability radially outwards which is larger than the permeability of the internal pressure sheath with respect to at least one of water, hydrogen sulphide or carbon dioxide.

22. The unbonded flexible pipe of claim 1, wherein the armouring elements are coated with the viscous fluid or are embedded in the viscous fluid.

* * * * *

UNITED STATES PATENT AND TRADEMARK OFFICE
CERTIFICATE OF CORRECTION

PATENT NO. : 11,231,132 B2
APPLICATION NO. : 16/477630
DATED : January 25, 2022
INVENTOR(S) : Michael Hjorth It is certified that error appears in the above-identified patent and that said Letters Patent is hereby corrected as shown below:

On the Title Page

Item (71) "National Oilwell Vareo Denmark I/S," should be "National Oilwell Varco Denmark I/S,"

Item (73) "National Oilwell Vareo Denmark I/S," should be "National Oilwell Varco Denmark I/S,"

Signed and Sealed this
Twentieth Day of September, 2022

Katherine Kelly Vidal
*Director of the United States Patent and Trademark Office*